(12) United States Patent
Schwingel et al.

(10) Patent No.: US 7,303,724 B2
(45) Date of Patent: Dec. 4, 2007

(54) COMPOSITE METALLIC MATERIALS AND STRUCTURES AND METHODS OF MAKING THE SAME

(75) Inventors: Dirk Schwingel, Ottweiler (DE); Michael Theobald, Marpingen (DE)

(73) Assignee: alm GmbH Gewerbepark Eschberger Weg (DE)

( * ) Notice: Subject to any disclaimer, the term of this patent is extended or adjusted under 35 U.S.C. 154(b) by 77 days.

(21) Appl. No.: 10/764,173

(22) Filed: Jan. 23, 2004

(65) Prior Publication Data

US 2004/0209107 A1 Oct. 21, 2004

(51) Int. Cl.
*B22F 3/11* (2006.01)
*B22F 7/00* (2006.01)

(52) U.S. Cl. .................. 419/2; 419/5; 419/8; 419/49
(58) Field of Classification Search .............. 419/2, 419/5, 8, 49
See application file for complete search history.

(56) References Cited

U.S. PATENT DOCUMENTS

| 2,917,384 | A | * | 12/1959 | Grandey | 419/14 |
| 3,087,807 | A | * | 4/1963 | Allen et al. | 75/415 |
| 4,861,546 | A | * | 8/1989 | Friedman | 419/8 |
| 5,151,246 | A | * | 9/1992 | Baumeister et al. | 419/2 |
| 5,564,064 | A | * | 10/1996 | Martin | 419/5 |
| 5,930,580 | A | * | 7/1999 | Everett | 419/2 |
| 5,972,521 | A | * | 10/1999 | Huskamp et al. | 428/547 |
| 6,698,331 | B1 | * | 3/2004 | Yu et al. | 89/36.02 |
| 2004/0081571 | A1 | * | 4/2004 | Vatchiants | 419/2 |

* cited by examiner

*Primary Examiner*—Roy King
*Assistant Examiner*—Ngoclan T. Mai
(74) *Attorney, Agent, or Firm*—Hanley, Flight & Zimmerman, LLC

(57) ABSTRACT

A composite material and method of making the same are disclosed. An example method for fabricating a composite material forms a core layer between opposing outer layers. The core layer includes a mixture of at least one metallic powder and at least one expanding agent. The example method removes moisture and gasses from the core layer by applying a first vacuum pressure to at least the core layer. The example method compresses the core layer to bond the core layer to the outer layers while a second vacuum pressure is applied to at least one of the outer layers. The resulting composite material has a compacted core layer that is substantially free from moisture and imbedded gasses. Additionally, the outer layers are substantially free from perforations enabling the escape of gas and moisture during foaming of the core layer. The composite material may be reshaped to form semi-finished products which, in turn, may be heated to foam the core material to form finished products.

9 Claims, 2 Drawing Sheets

COMPOSITE METALLIC MATERIALS AND STRUCTURES AND METHODS OF MAKING THE SAME

FIELD OF THE DISCLOSURE

The present disclosure relates generally to composite metallic materials and structures and, more particularly, to composite materials having a porous metallic core and metal outer layers and methods of making the same.

BACKGROUND

Multilayered composite materials are generally well known. The individual layers of a composite material can typically be differentiated by the material type as well as the different structural properties of the materials (e.g., porosity). More recently, multilayered composite materials utilizing metallic and non-metallic foams have been developed to provide materials having good insulating properties as well as lightweight structures made from these materials. For example, German publication DE 39 05 871 A1 describes a highly porous inorganic material for use as thermal insulation in a three-dimensional composite material.

Such composite materials or structures made from such composite materials are typically characterized by high rigidity and low density or weight and may be used for any application requiring these characteristics such as, for example, structural parts in automotive and aerospace applications. Additionally, the above-mentioned composite materials also typically provide low thermal conductivity and good mechanical and acoustical damping characteristics, which enable their use as thermal and acoustical insulating materials as well as for the absorption of mechanical energy.

Processes for producing known types of composite materials and structures made from these materials are described in numerous publications. For example, German publication DE 44 26 627 C2 describes a process by which one or more metallic powders are mixed with one or more expanding agent powders. These metallic powder mixtures are typically compressed via axial hot pressing, hot-isostatic pressing, or rolling and, in a subsequent operation, are joined with previously surface-treated metal plates or outer cover layers through roll-bonding to form composite materials. The composite materials may then be formed or reshaped into semi-finished products or structures by, for example, pressing, deep drawing, bending, etc. The semi-finished products or structures are then heated to a temperature that lies in the solid/liquid range (e.g., somewhat near or above the melting point) of the metallic powder, but below the melting point of the metal outer layers. As the metallic powder is melted, the expanding agent powder, which is intermixed with the metallic powder, undergoes gas separation (i.e., outgasses). The gasses generated in this manner are essentially trapped bubbles that form expanding closed pores within the viscous core layer (i.e., the melted or melting metallic powder), which results in a corresponding increase in the volume of the core layer. The foamy (i.e., porous) core layer is then stabilized by a subsequent cooling operation.

European publication EP 1 000 690 A2 describes a modification of the process described in German publication DE 44 26 627 C2, in which the powder pressing is already designed in a closed porous manner. In particular, EP 1 000 690 A2 describes the production of a composite material based on a powder preform (i.e., a preformed or pressed core layer) that is initially produced to have open pores, which later become closed pores during a subsequent roller plating with the cover (e.g., outer metal) layers. The initial open porosity characteristic of the core layer serves to prevent potential gas separations of the expanding agent during its storage from causing geometric changes (e.g., expansion) of the preformed core layer, thereby preventing problems during the subsequent process of bonding the cover layers to the core layer. Furthermore, the initial open porosity characteristic may facilitate the break up of the oxide layers that may be formed during storage of the preformed core layer when the core layer is joined with the cover layers to form the composite material.

Another process for producing foamy or foamed composite materials described in German publication DE 41 24 591 C1, injects a metallic powder mixture into a metallic hollow section and performs a subsequent rolling operation to join the powder to the surfaces of the metallic hollow section. The reshaping of the semi-finished product and the subsequent foaming procedure are then performed in the same manner as described above in connection with German publication DE 44 26 627 C2.

European publication EP 0 997 215 A2 describes yet another process for producing a metallic composite material having solid metallic cover layers and a porous metallic core having a closed-pore characteristic. As described in EP 0 997 215 A2, the production of the compressed core layer and the fusion of the cover layers with the core layer are performed in one step. In particular, the powder mixture is introduced into the roll gap between the two cover layers and is compressed between the cover layers during the rolling process. In addition, this publication also suggests that the powder should be supplied in an inert gas atmosphere to prevent the formation of oxide layers that may adversely affect the fusion between the cover layers and the powder mixture that forms the core layer.

In another process described in German publication DE 197 53 658 A1, the operations associated with the production of the composite between core and cover layers, on the one hand, and the foaming, on the other hand, are combined. In particular, the core is introduced between the cover layers in the form of a powder preform and first joins with these layers as a result of the foaming procedure. As a result of the pressure supplied during the foaming of the core, the cover layers are subjected to reshaping in accordance with a form encasing them.

U.S. Pat. No. 5,972,521 A describes a process for producing a composite material blank in which air and moisture are removed from the powder through evacuation. Before the powder is compacted and joined with the cover layers, the evacuated air is replaced with a gas that is inert with respect to the core material and that is under increased pressure.

All of the above-described known processes imbed and compress (during compaction) a gas (e.g., air, an inert gas, etc.) in the core layer during its production. During the foaming process, the increased temperatures associated therewith may cause the imbedded gasses to form pores before the melting point of the metallic powder is reached. As a result, a substantial number of open, fissure-shaped, interconnected and irregularly-shaped pores may be formed instead of or in addition to more desirable closed, spherical pores, which provide better load transfer characteristics and, in general, a more stable composite material. While, for example, a process described in United States publication U.S. Pat. No. 5,564,064 A1 strives for open porosity through the expansion of enclosed gases below the melting temperature of the powder material, such open-pore composite materials are not well-suited for use in many structural applications.

Further, the open, fissure-shaped pores that are formed at temperatures below the melting point of the powder material as described above act as collecting areas for the gases created by the outgassing of the expanding agent. This compromises the homogeneous formation of preferably uniform, closed pores, which provide desirable homogeneous material properties such as, for example, high material stability. Because only the melting temperature of the core layer and not that of the cover layers is reached during the foaming process, the gasses produces by the expanding agent are prevented from escaping through the cover layers. This may lead to the formation of irregularly shaped, large-volume pores in the area immediately adjacent to the cover layers, which prevents an optimal connection between the core and the cover layers and may lead to localized delamination or separation of the core and cover layers.

The atmospheric humidity to which the powder material of the core layer is exposed during storage, transport and processing may cause an effect similar to that caused by the gases imbedded in the core layer during compaction of the core material. Due to the hydrophilic behavior of numerous powders, ambient humidity or moisture, which evaporates at relatively low temperatures (e.g., far below the melting temperature of the core material) when heated, is imbedded and, as described above, can lead to the formation of irregular, open pores with the associated performance disadvantages.

While the porosity resulting from the outgassing of the expanding agent powder in the viscous solid/liquid range of the core layer is held homogeneous to the greatest extent possible by ensuring that the expanding agent powder has a low grain size distribution and is evenly (homogenously) mixed with the metallic powder of the core material, undesirable open pores caused by gas inclusions and humidity as described above are largely uncontrollable.

The uncontrollable and undesirable open pore condition is typically responsible for the distribution or variation of material characteristic values within a production series. Such production process variability generally results in inadequate reproducibility of composite materials that are made of solid metallic cover layers and a closed porous metal core material as described above. Additionally, the presence of air and moisture also encourages the formation of oxides, which can compromise the metallic bond between the powder particles of the core layer as well the bonds between the core layer and the cover layers Finally, European publication EP 0 927 590 A2 describes a composite material structure and fabrication process that is designed to prevent gas accumulations and the irregular porosity and related local delamination spots. In particular, the cover layers are perforated at (e.g., via punched holes) at regular intervals to enable the escape of gases generated during foaming of the core material. However, perforating the cover layers in this manner may structurally compromise the resulting composite material and/or may be undesirable for aesthetic/visual reasons in many applications.

DETAILED DESCRIPTION

Figure 1:
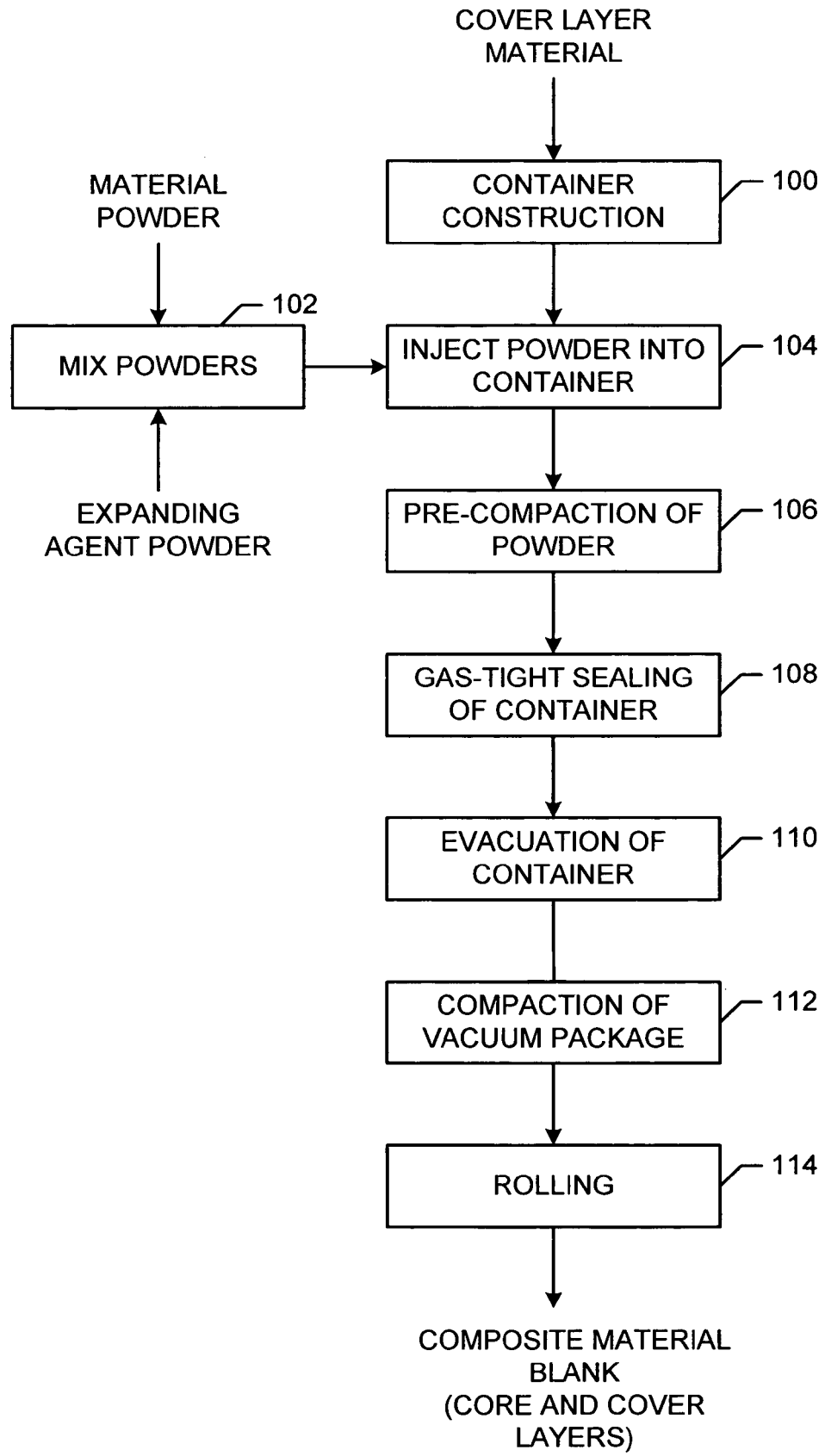
FIG. 1 is a flow chart depicting an example process for producing an example composite material blank having cover layers and a foamed core layer.

Example metallic composite materials having solid metal cover plates and a foamed, closed-pore metallic core disposed between the metal cover plates are described herein. More specifically, the example composite materials described herein are produced by introducing a mixture of a metallic powder and a gas-separating expanding agent powder between metallic cover plates and then heating the materials to about the melting point of the metallic powder to cause the expanding agent powder to outgas and foam the core material in a homogenous manner. In some applications, the composite material may be shaped prior to foaming to produce a semi-finished component and then treated thermally to foam the core to form a final component.

The example processes for manufacturing the example composite materials described herein generate porosity within the core material substantially only from the outgassing of the expanding agent powder in a temperature range close to the melting temperature of the metallic powder core material, and substantially eliminate the uncontrolled formation of pores as a result of gases and/or moisture trapped or imbedded in the material. The example composite materials described herein may be used to produce a composite-material semi-finished product, which may be reshaped and foamed in additional steps to economically produce finished products.

In one example process, a homogeneous mixture of a metallic powder and expanding agent powder are dehumidified to remove moisture therefrom. The dehumidified powder mixture is then compacted, introduced between the metal cover layers and bonded to the metal cover layers in an environment that is substantially free of air or other gases. In this manner, the inclusion of gases (e.g., inert gas, air, etc.) and/or moisture in the core layer may be substantially eliminated, thereby substantially eliminating the aforementioned uncontrolled formation of open pores below the solid/liquid (e.g., the melting point) temperature of the metallic powder.

The dehumidification process or removal of moisture from the materials making up the core material can occur before its compaction under vacuum and/or through heating. In any case, the temperature at which moisture is removed preferably remains below the outgas temperatures of the expanding agent, which are reduced by the vacuum.

The powder mixture may be compacted under vacuum using commonly known methods such as, for example, axial cold or hot pressing, cold or hot isostatic pressing, etc. As result, the powder blank is coupled under vacuum with the metallic cover layers.

While it is possible to recreate a vacuum before each phase of the process, it is preferred that the drying of the powder as well as the subsequent compaction and platting (i.e., the joining of the cover plates to the core material) are performed within the same vacuum (i.e., without interrupting the vacuum throughout the entire production process of the composite blank).

In accordance with a preferred production process, the removal of moisture from the powder mixture is achieved by holding the core material powder mixture (which may be made of one or more metallic powders and at least one expanding agent powder) in a receptacle under vacuum until the water in the powder is evaporated to the greatest extent possible. The vacuum receptacle is configured so that the powder is compacted within the receptacle and to simultaneously form the cover layers. In this manner, the bonding of the powder core with the cover layers within the receptacle walls occurs simultaneously with the bonding of the powder core. Thus, throughout the entire production process for the composite material blank, only one pumping process is needed to produce a vacuum, which simplifies and accelerates the production process. The composite material blank created in the example manner described above can then be reshaped into a semi-finished product, and this semi-finished product can be foamed to produce a finished part or component.

Figure 2:
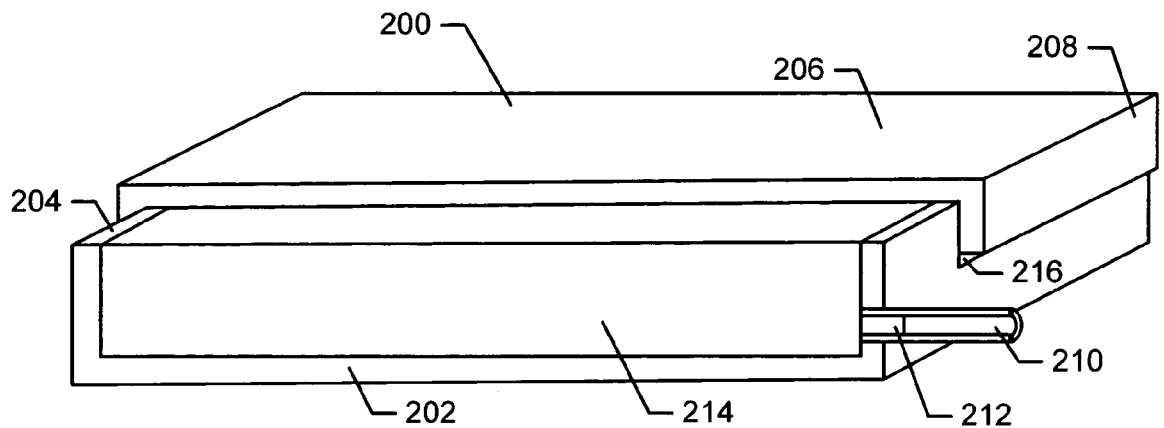
FIG. 2 is a sectional view of an example vacuum receptacle that may be used to implement the example process of FIG. 1.

Now turning to FIGS. 1 and 2, an example process for producing a composite material blank including cover layers and a core layer to be foamed is depicted. For this purpose, a vacuum container such as, for example, the example container 200 of FIG. 2 (block 100) is constructed. As shown in the sectional view of FIG. 2, the vacuum container 200 may include a box-shaped container underpart made of the cover layer material and including a floor 202 and walls 204. As shown, the example vacuum container 200 may also include a top cover 206 that has a circumferential edge 208. The circumferential edge 208 is configured so that when the cover 206 and the underpart 202, 204 are assembled, the outer walls 204 of the underpart 202, 204 are tightly sealed. Furthermore, the underpart 202, 204 has an integral tubular vacuum connection 210 welded to the wall 204. The interior of the vacuum connection 210 may include a filter 212. The filter 212 may be made of, for example, steel wool to prevent powder material 214 from being drawn from the interior of the container 200 during evacuation.

The preferably homogeneous powder mixture 214 may be made of one or more metallic powders and at least one expanding agent powder (block 102). The powder mixture 214 is injected or otherwise disposed in the container underpart 202, 204 and pre-compacted about 50 to 70% in the container underpart 202, 204 via, for example, axial pressing (block 106). It should be noted that the powder filling may completely fill the container underpart 202, 204 up to the upper edge of the wall 204. Alternatively, a pre-compacted powder body (not shown) prefabricated from the powder mixture may be inserted into the container underpart 202, 204. Such a pre-compacted powder body is preferably configured to fit snugly or with very little side play within the container underpart 202, 204 to achieve the most complete filling possible. In addition, such a pre-compacted powder body can be produced via common processes such as, for example, cold isostatic pressing (CIP), hot isostatic pressing (HIP), axial pressing under vacuum, etc.

After the filling of the container underpart 202, 204, the top cover 206 is disposed on the container underpart 202, and both parts are welded together in a vacuum-sealed manner via a welded seam 216 along the lower edge of the cover edge 208 (block 108). The vacuum connection 210 is subsequently connected to a vacuum pump and the container 200 is evacuated (block 110). The vacuum is sustained through constant pumping until the interior of the container 200 and the powder 214 contained therein are substantially free of trapped gases and moisture. In practice, vacuum pressures in the range of $10^{-3}$ to $10^{-4}$ mbar may be used to achieve a desired level of evacuation and removal of trapped gasses and moisture. The container 200 may also be heated to a temperature lower than the outgassing temperature of the expanding agent powder to accelerate the removal of trapped gasses and moisture from the powder 214. Before the separation of the vacuum pump from the connection 210, the connection 210 is welded closed so that the vacuum in the interior of the container 200 is sustained following removal of the vacuum source (i.e., the pump).

Then, the entire vacuum package, including the container 200 and powder mixture 214, is compacted using one of a high-speed forging process, an explosion forging process, an axial pressing process, a cold isostatic pressing process, and a hot isostatic pressing process, etc. below the outgas temperature of the expanding agent powder (block 112). The powder mixture 214 is thereby compacted between about 80% to about 100% depending on the selected compaction process and a metallic bond is achieved between the powder layer 214 and the cover plates (e.g., the bottom or underpart 202, 204 and the top cover 206 of the container 200).

The interior of the container 200 remains under vacuum during the compaction process, even if the pressure increases in proportion to the degree to which the container 200 is filled prior to its compaction. Based on a theoretical density or filling degree of the powder of about 60% before the compaction and typically 96% thereafter, the pressure in the compacted vacuum container is about 16 times as large as the pressure prior to compaction.

Based on high vacuum pressures in the range of $10^{-3}$ to $10^{-4}$ mbar before the compaction, the pressures in the container after its compaction may lie in ranges much smaller than 1 mbar (i.e., the upper limit of a fine or high vacuum). In any event, the powder body within the container 200 is substantially free of inclusions from gases and moisture.

In some cases, the container 200 may be torn or split open along its edges 204, 208 (e.g., at the welded seam 216) during, for example, high-speed or explosion forging. Because the reshaping process supported by the vacuum takes place very quickly (e.g., a few milliseconds during explosion forging) and because the powder core 214 is extremely dense, the penetration of air and moisture is virtually impossible at this phase of the process.

Figure 3:
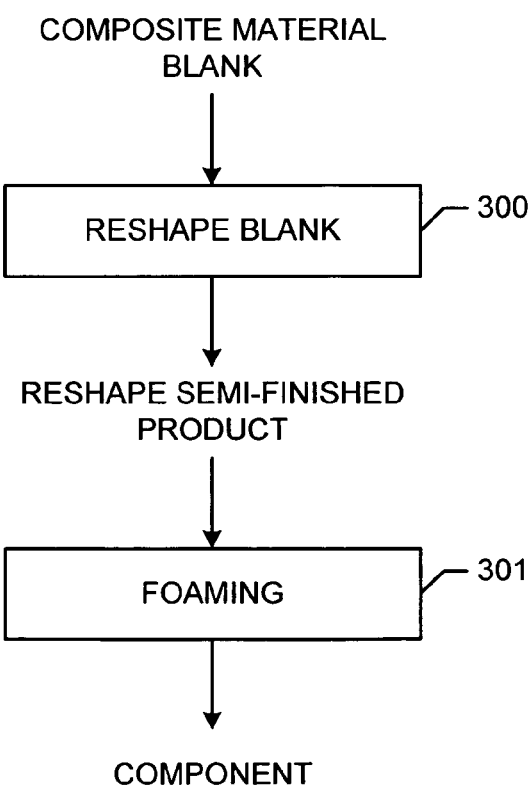
FIG. 3 is a flow diagram depicting further processing of the example composite material blank of FIG. 1 into a semi-finished product and a finished component or part.

The compacted package may be reshaped into a two-dimensional composite material blank by rolling (block 114). In turn, the composite material blank may be reshaped into a semi-finished product (block 300) in the form of a component as depicted in FIG. 3. In this process, common methods such as, for example, deep drawing may be used as reshaping procedures, thereby enabling the composite material blank (which is essentially a flat structure) to be transformed into a semi-finished product (e.g., a curved structure).

In the last step of the process, the semi-finished product is heated to the solid/liquid range (e.g., near to or equal to the melting point) of the metallic powder, whereby the outgas temperature of the expanding agent is exceeded and its outgassing is thus activated (block 310). As described above, the cover material is selected in such a manner that its melting temperature lies suitably higher than the melting point of the metallic powder of the core layer.

In the case that the same material, e.g. aluminum, is used for the core layer as well as the cover layers, different melting temperatures can be set through different alloying additions to the powder and cover layer material. For example, titanium hydride may be used as an expanding agent with aluminum and, in some cases, may be added to the metallic powder in the amount of about 0.3% to 1.9% by weight.

Although certain methods and apparatus have been described herein, the scope of coverage of this patent is not limited thereto. To the contrary, this patent covers all embodiments fairly falling within the scope of the appended claims either literally or under the doctrine of equivalents.

What is claimed is:

1. A process for producing a composite-material semi-finished product configured to be foamed when heated for the fabrication of components having solid metallic cover layers and a closed porous metallic foam core arranged between the metallic cover layers, the process comprising:
   removing under vacuum pressure, at least one gas and moisture from a powder mixture made of at least one metallic powder and at least one expanding agent powder;
   compacting the powder mixture to a core layer; and
   metallically joining the core layer to the composite-material semi-finished product via at least one oxide-free cover layer under a pressure and at a temperature below an outgas temperature of the expanding agent powder, wherein the at least one oxide-free cover layer is under vacuum pressure during the joining of the core layer to the composite-material semi-finished product.

2. A process as defined in claim 1, further comprising:
   substantially filling a container having first and second opposing covers with the powder mixture;
   vacuum sealing the container;
   substantially evacuating the container; and
   compacting the container to simultaneously compact the powder mixture and metallically join the powder mixture to the first and second opposing covers.

3. A process as defined in claim 2, wherein substantially filling the container comprises disposing a pre-compacted body made of the powder mixture, wherein the pre-compacted body is made using one of a cold isostatic pressing process or a hot isostatic pressing process.

4. A process as defined in claim 2, wherein compacting the container comprises using one of a high-speed forging process, an explosion forging process, an axial pressing process, a cold isostatic pressing process or a hot isostatic pressing process.

5. A process as defined in claim 1, wherein removing the at least one gas and moisture from the powder mixture comprises heating the powder mixture to a temperature below the outgas temperature of the expanding agent powder during the removal process.

6. A process as defined in claim 1, further comprising:
   shaping the composite-material semi-finished product into a semi-finished product generally corresponding to a component; and
   foaming the semi-finished product at a temperature above the outgas temperature of the expanding agent powder, within the solid/liquid range of the metallic powder, and below a melting temperature of the cover layer material to form the component.

7. A process as defined in claim 6, wherein the component is configured for use in at least one of an automotive application, a ship building application, an aerospace application, a mechanical energy absorption application, a shipping container application, a thermal insulation application or an acoustical insulation application.

8. A process as defined in claim 1, wherein removing the at least one gas and moisture comprises removing substantially all foreign gas inclusions and moisture from the powder mixture.

9. A process as defined in claim 1, wherein the core layer and the at least one oxide-free cover layer are made of aluminum, and wherein the expanding agent powder is between about 0.3 and 1.9 percent by weight of the powder mixture.

* * * * *